United States Patent [19]

Parsons et al.

[11] Patent Number: 5,038,901
[45] Date of Patent: Aug. 13, 1991

[54] CLUTCH CONTROL SYSTEM IN WHICH THE CLUTCH ACTUATION IS INITIATED BY CONTROL OF THE GEAR SHIFT LEVER

[75] Inventors: David Parsons; Alastair J. Young, both of Kenilworth; Roger P. Jarvis, Leamington Spa; Harry M. Windsor, Harbury, all of United Kingdom

[73] Assignee: Automotive Products Plc, England

[21] Appl. No.: 458,619

[22] PCT Filed: May 16, 1988

[86] PCT No.: PCT/GB88/00382
§ 371 Date: Feb. 15, 1990
§ 102(e) Date: Feb. 15, 1990

[87] PCT Pub. No.: WO89/00517
PCT Pub. Date: Jan. 26, 1989

[30] Foreign Application Priority Data

Jul. 17, 1987 [GB] United Kingdom ............. 8716973

[51] Int. Cl.$^5$ .................................................. B60K 41/22
[52] U.S. Cl. ............................. 192/3.55; 192/3.58; 192/3.62; 192/3.63; 74/335; 74/473 R
[58] Field of Search ............. 192/3.55, 3.58, 3.62, 192/3.63; 74/335, 471 XY, 473 R, 473 P; 200/61.88

[56] References Cited

U.S. PATENT DOCUMENTS 3,631,946  1/1972  Grosseau .................. 192/3.58
4,183,424  1/1980  Rumyantsev et al. ....... 192/3.58
4,723,642  2/1988  Grunberg et al. ......... 192/3.62 X

FOREIGN PATENT DOCUMENTS 57-90426  6/1982  Japan ........................ 192/3.58

Primary Examiner—Richard Lorence
Attorney, Agent, or Firm—Davis, Bujold & Streck

[57] ABSTRACT

A motor vehicle having a transmission comprising a clutch (14), a clutch control (18, 20) and a change-speed gearbox (12). The gearbox (12) has a plurality of mutually exclusively engageable gear ratios any desired one of which can be engaged by a manually operated gear lever (16) which comprises a shaft (33) pivoted at (34) and a hand knob (42) on a tube (40) rockably pivoted in force relatively to the shaft (33), a signal is sent to the clutch control (18, 20) causing automatic disengagement of the clutch (14). Further manual force on the tube (40) pivots the shaft (33) in direction (A) or (B) to the opposite side of a gear shift pattern. The clutch control (18, 20) receives a signal (54') that a new gear ratio has been engaged and automatically reengages the clutch (14). Clutch control (18, 20) includes a memory (68) which memorizes in which direction the gear lever (16) was pivoted to engage the currently engaged gear ratio, and disengagement of the clutch (14) when the tube (40) is rocked in the same direction as that in which the gear lever (16) was pivoted to cause the engagement of the currently engaged gear ratio.

6 Claims, 3 Drawing Sheets

CLUTCH CONTROL SYSTEM IN WHICH THE CLUTCH ACTUATION IS INITIATED BY CONTROL OF THE GEAR SHIFT LEVER

This invention concerns a transmission for a motor vehicle.

The transmission is of the kind comprising a change speed gearbox in which its different gear ratios can be selected and de-selected as desired by the driver manually moving a gear lever, a clutch interposed between the engine of the vehicle and the gearbox, and a control causing automatic disengagement of the clutch when deselection of the currently selected gear ratio is initiated by the driver and automatic re-engagement of the clutch when a said gear ratio is selected. In such a transmission there is no need for the driver to act separately to operate the clutch for gear ratio changes, thus the vehicle does not need a driver operated pedal to work the clutch, but only requires accelerator and brake pedals.

According to the invention there is provided a transmission for a motor vehicle wherein the transmission is intended for transmitting rotary motion between an engine of the vehicle and at least one ground running wheel of said vehicle, said transmission comprising a change speed gearbox comprising at least first and second rotatable shafts, said second shaft being for transmitting rotary motion between said gearbox and a said ground running wheel, a plurality of rotatable gear ratios each being de-selectable and each being mutually exclusively selectable for transmitting rotary motion between said shafts through each selected one of said gear ratios, and gear ratio selection means including a gear lever which is manually movable to cause de-selection of any previously selected gear ratio and to cause selection of any desired said gear ratio, and clutch means connected with the first shaft and intended for interposing between said engine and said first shaft, the clutch means being engageable to transmit rotary motion between the said engine and first shaft and dis-engageable to interrupt that transmission, characterized by clutch control means to automatically engage and disengage said clutch means, said clutch control means comprising first observing means to observe when any said gear ratio is selected, said gear lever having a first part and a second part mounted on the first part and being movable with said first part in response to manual force applied to the second part for transmission to said first part, said gear ratios being divided into at least first and second divisions, the first division comprising at least one but not all of said gear ratios and the second division comprising at least one remaining said gear ratio, limits of movement of the first part of the gear lever in first and second opposite directions comprising first and second gear shift limit positions which are spaced apart and fixed such that the movement of the first part of the gear lever in the first direction is away from the second limit position and towards the first limit position and movement of said first part in the second direction is away from the first limit position and towards the second limit position, and wherein movement of the first part of the gear lever in said first direction into said first limit position causes selection of a said gear ratio in said first division and movement of said first part in said second direction into said second limit position causes selection of a said gear ratio in said second division, the gear lever being arranged such that the second part automatically adopts a pre-determined initial position relative to said first part when no manual force is applied to said second part, said second part being movable to a limited extent relative to the first part in each of two opposite directions from said initial position when a manual force is applied to the second part and wherein one of those two opposite directions is in said first direction and the other of those two opposite directions is in said second direction, second observing means to observe movement of the second part of the gear lever relative to the first part in said first and second directions respectively, said clutch control means being so arranged that when the first part of the gear lever is in a said limit position so that a said ratio in the division correlated co that limit position is in a selected state movement of said second part relative to the first part in a said direction towards the other limit position is observed by said second observing means causing the clutch control means to cause automatic disengagement of the clutch means, said clutch control means being further arranged such that subsequent to a de-selection of any said gear ratio, the next selection of a said gear ratio observed by said first observing means causes said clutch control means to automatically engage said clutch means, said clutch control means further comprising a memory arrangement for memorizing in which of said first or said second directions the first part of said gear lever was moved into the first or second limit positions respectively to cause the selection of the gear ratio currently in the selected state, and said control means being responsive to said memory arrangement such that said control means inhibits disengagement of said clutch means whilst said gear ratio remains in said currently selected state and the second part of the gear lever is moved in the memorized direction relative to the first part.

The transmission formed in accordance with the invention has a number of advantages. One is that the transmission does not need to "know" which particular gear ratio has been selected, only that a ratio has been selected and the direction in which the gear lever was moved to cause selection. That direction is memorized. Should the driver apply force to the second part of the gear lever (such as by the driver resting his hand on said second part) so as to move that second part in the memorized direction relative to the first part, the control means recognizes that action does not signify a wish by the driver to change gear ratios. It makes that recognition because the memorized direction is opposite to that in which the first part of the gear lever will have to be moved in order to de-select the currently selected gear ratio. Therefore the clutch means is not automatically disengaged when the aforesaid recognition occurs.

Further advantages of the transmission will be understood from the following description of the invention, given by way of example, with reference to the accompanying drawings in which:

FIG. 1 diagrammatically illustrates a transmission formed according to the invention, in combination with an engine for the vehicle;

In the following description like references refer to like or comparable parts.

Figure 1:
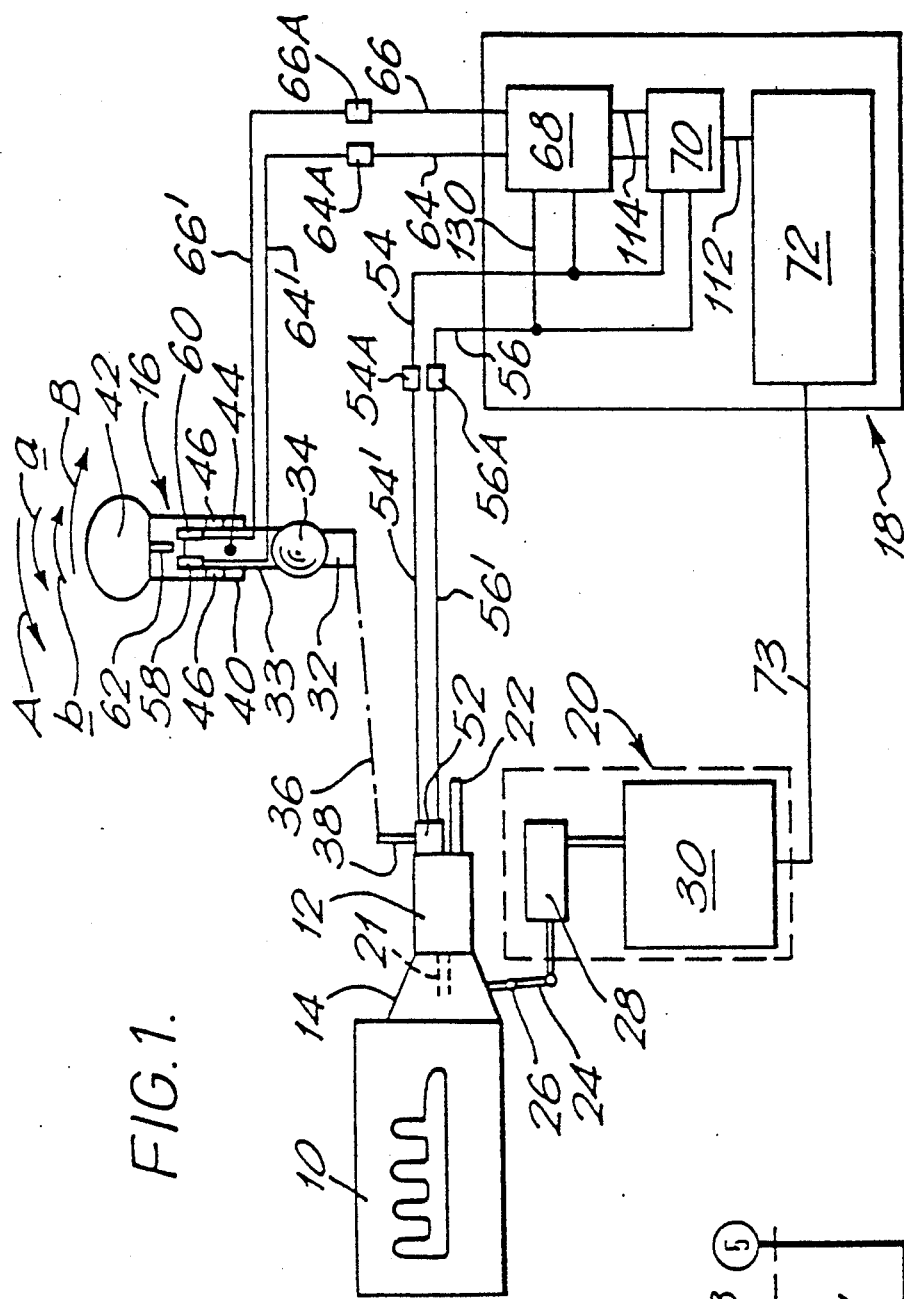

With reference to FIG. 1 the transmission is intended to be used in conjunction with an internal combustion engine 10 for a motor vehicle. The transmission comprises a change speed gearbox 12, a friction clutch within a bell-housing 14, a manually movable gear lever 16 for selecting and de-selecting different gear ratios in the gearbox 12, and a clutch control for automatically engaging and disengaging the clutch; that clutch control including an electronic control 18 and a fluid flow control 20.

The gearbox 12 has a rotatable output shaft 22 to drive through any suitable known means one or more ground running wheels of the vehicle. The gearbox 12 also has a rotatable input shaft 21. The friction clutch in the bell-housing 14 can be of any type known per se suitable when the clutch is engaged for transmitting rotary drive between the engine 10 and the gearbox input shaft, and the clutch being capable of being disengaged to interrupt that transmission. The clutch can be controllably and progressively disengaged and re-engaged using a release fork or lever 24 pivoted at 26 and interacting in known manner with the clutch. A fluid pressure piston and cylinder unit or actuator 28 acts on the pivoting lever 24 so that the rate and degree of engagement or disengagement of the clutch at any instant is controlled by the amount of fluid in the actuator 28. The amount of the fluid, which may be hydraulic fluid, acting in the actuator 28 is controlled by a fluid pressure supply and control system 30 which forms the fluid flow control 20 with the actuator.

Gearbox 12 is of any suitable kind. In this example it comprises six de-selectable and mutually exclusively selectable rotable gear ratios (hereinafter called gears for convenience) to transmit rotary motion between the shafts 21 and 22 and providing first, second, third, fourth, fifth and reverse gears represented in FIG. 2 by the symbols 1, 2, 3, 4. 5 and R respectively. The gear lever 16 includes a shaft 32 having a ball formation 34 for a pivot mounting of a type known per se permitting a degree of universal movement to the gear lever. The lower end of shaft 32 is connected by any means 36 known per se for conveying movement of the gear lever 16 to a selection crank arm 38 causing selection and de-selection of any desired gear when the portion of the gear lever 16 above the ball 34 is moved in accordance with the gear shift pattern in FIG. 2. Besides shaft 32, gear lever 16 also comprises a tube 40 (shown in section) surmounted by a knob 42. Tube 40 is mounted by a pivot 44 on the shaft 32. The knob 42 is intended for the application of manual force directly thereto by the hand of the driver for changing gear. When no manual force is applied to the knob 42 the tube 40 adopts a centralized or initial position with respect to the shaft 32 under the action of resilient means 46 acting, between the shaft and the tube 40, along an axis transverse to both the axis of pivot 40 and the axis of the shaft 32. Due to the pivot point 44 the knob 42 can only pivot respectively to the shaft 32 in each of two directly opposite directions a and b about the axis of pivot 44 when manual force, having a component along direction a or b, is applied to the knob. From the initial position the knob 42 can only pivot relatively to the shaft 32 to a limited extent, after which the tilted tube 40 acts on an upper part 33 (that part above the ball 34) of the shaft 32. Thus if the component of manual force continues to be applied and if the upper shaft part 33 is free to pivot about the ball pivot 34, in direction a or b, the upper shaft part then pivots about the ball pivot in direction A or B which is essentially the same direction as a or b respectively.

Figure 2:
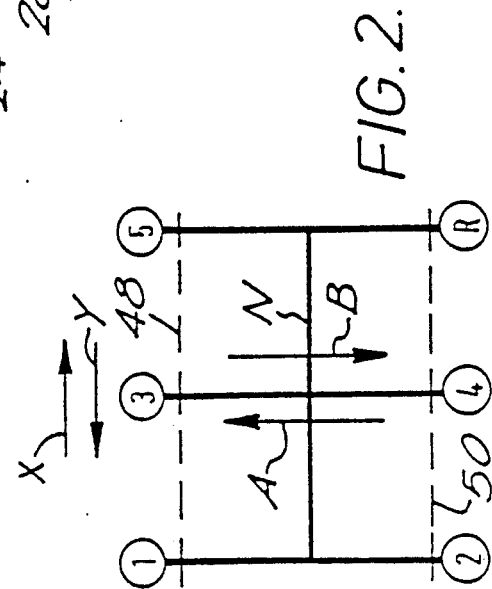
FIG. 2 illustrates a gear shift pattern to be followed by the gear lever in FIG. 1 for selecting and de-selecting the different gear ratios in the gearbox in FIG. 1.

In the gear shift pattern in FIG. 2 line N lies between extreme positions 48 and 50 at opposite sides of the gear shift pattern. It is to either extreme position 48 or 50 that upper shaft part 33 must be moved along direction A or B (possibly combined with a movement in direction X or Y) when it is desired to select any gear in the division or group of gears consisting of first, third and fifth gear or in the division or group of gears consisting of the second, fourth and reverse gear.

The gearbox 12 is provided with gear condition observing means 52, providing electrical signal outputs on line 54', 54A, 54 and line 56', 56A, 56 serving as inputs to the electronic control 18. Observing means 52 is arranged to observe when any gear is selected and give an output on line 54 signifying that a gear is in the selected state. The observing means 52 is also arranged to observe when none of the gears is in a selected state and gives an output which represents that no gear is selected. Furthermore the observing means 52 is arranged to observe when the gearbox 12 is in a reference neutral state corresponding to the position of the upper shaft part 33 substantially coinciding with any point along the neutral line N in the gear shift pattern (FIG. 2). When that happens the observing means 52 gives an output signal on line 56 signifying that the position of the upper shaft part 33 is coinciding with some point on line N whether the upper shaft part dwells on the line N or is merely crossing it quickly (i.e., whether the gearbox 12 is dwelling in the reference neutral state or has been moved quickly through that reference state). When the gearbox is not in the aforesaid reference neutral state (i.e., the upper shaft part 33 is not in coincidence with any point on line N) the observing means 52 provides a signal on line 56 to signify that condition of the gearbox. Elements 54A and 56A can be inverters, and in order to operate the electronic control 18 in the desired manner the observing means 52 is arranged to provide a signal which appears on line 54 at logic level "1" when any gear is in the selected state and ac logic "0" when no gear is in a selected state and is arranged to provide a signal which appears on line 56 at logic "1" when the gearbox 12 is in the reference neutral state and at logic "0" when the gearbox is not.

In the gear lever 16 another observing means is provided which comprises a pair of spaced magnetic sensors 58 and 60 firmly attached to the upper part 33 of the shaft 32 and a permanent magnet 62 firmly attached to the knob 42. When the tube 40 and knob 42 are in the centralized or initial position relative to the shaft 32, the magnet 62 is mid-way between both the sensors 58 and 60 which are thus not influenced by the magnet and provide signals on lines 64 and 66 signifying that the tube 40 and knob 42 are not tilted in direction a or b relative to the shaft 32. When the tube 40 and knob 42 are tilted relative to shaft 32 in direction a or direction b the magnet 62 comes closer to either sensor 58 or 60 causing the appearance of a signal on line 64', 64A, 64 or line 66', 66A, 66 to signify that tilt. Elements 64A and 66A can be inverters, and in order to operate the electronic control in the desired manner the sensor system is arranged so that a signal at logic level "0" appearing on line 64 indicates no tilt of knob 42 in direction a but one at logic "1" does indicate a tilt in direction a. Whilst a signal at logic "0" appearing on line 66 indicates no tilt of knob 42 in direction b, but one at logic "1" does indicate a tilt in that direction.

Figure 3:
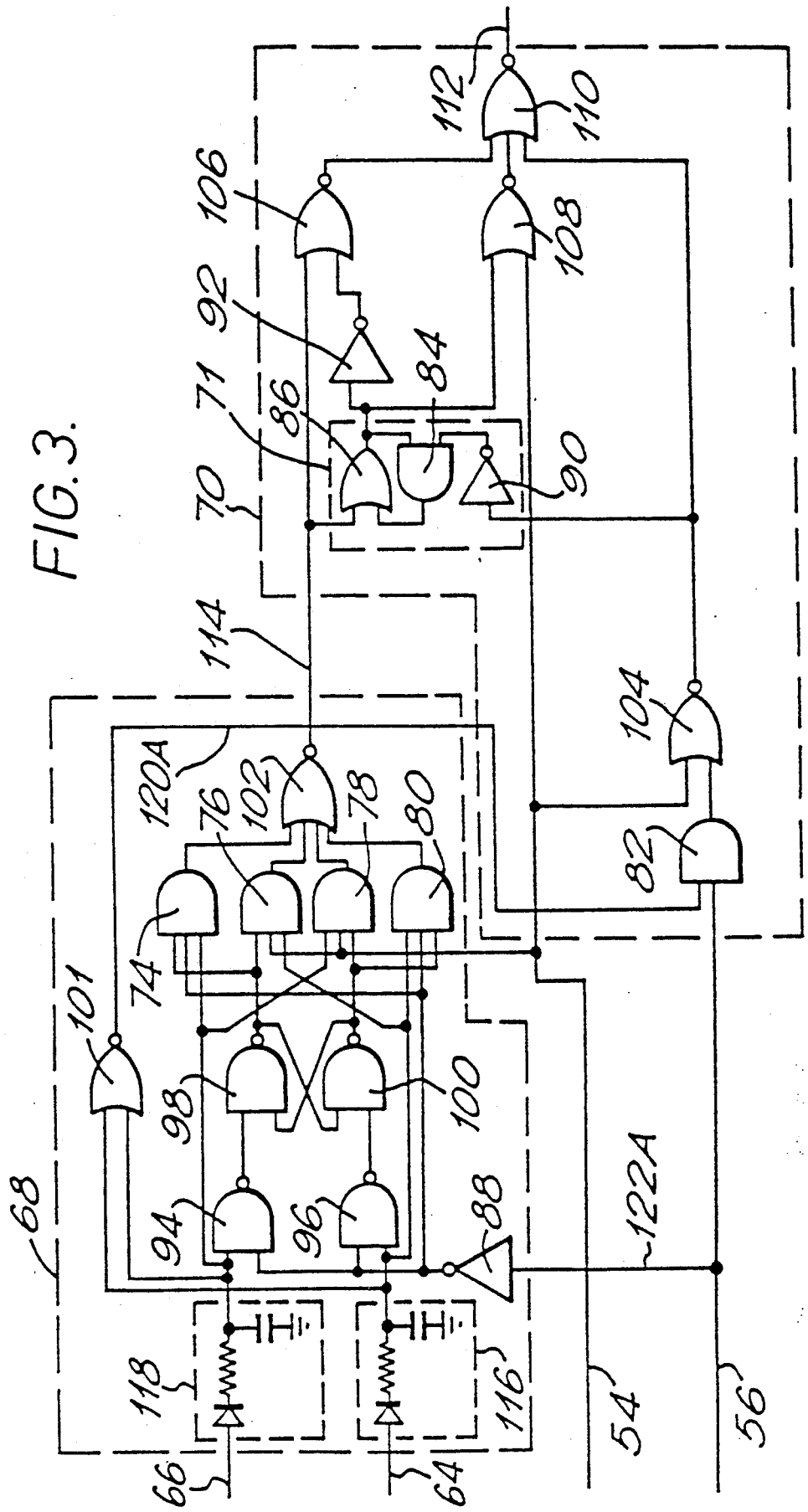
FIG. 3 illustrates a logic circuit included in an electronic control part of the clutch control means of the transmission in FIG. 1.

In the electronic control 18 there are a memory circuit 68, an initiating circuit 70, and an actuating circuit 72 which sends signals on line 73 to actuate the fluid flow control 20. With particular reference to FIG. 3 the circuits 68 and 70 comprises AND gates 74, 76 78, 80, 82 and 84, OR gate 86, NOT gates or inverters 88, 90 and 92, NAND gates 94, 96, 98 and 100, and NOR gates 101, 102, 104, 106, 108 and 110.

In the initiating circuit 70, the sub-circuit 71 formed by gates 84, 86 and 90 is a latch. When the output 112 from circuit 70 is ac logic "0" the actuating line circuit 72 operates to provide a signal on line 73 causing the fluid flow control 20 to disengage the clutch and hold the latter dis-engaged for as long as the signal on output line 112 remains ar logic "0". On the other hand when the output signal on line 112 is at logic "1", the circuit 72 operates to provide a signal on line 74 causing the control 20 to engage the clutch and keep it engaged whilst line 112 remains at logic "1".

If, for example, we consider the situation where the first, third or fifth gear is selected, then the signal on line 54 is at logic "1" and the signal on line 56 is at logic "0"; furthermore the upper part 33 of the shaft 32 will be at some place, on extreme position 48, corresponding to the selected gear, and provided no manual force is applied to the knob 42 it will be in its initial or centralized position and thus the signals on lines 64 and 66 will each be at logic "0". In this situation the output on line 114 from the memory circuit 68 is at logic "1", and so is the output on 112. Thus the clutch is engaged.

Now when it is desired to change up or down a gear, that is to select second or fourth gear as appropriate in this example, the upper shaft part 33 will have to be moved from the extreme position 48 to extreme position 50, namely the shaft part 33 will have to move in direction B. To do that the driver first pulls on the knob 42 causing it to pivot in direction b. Thus the signal on line 66 changes to logic "1" whilst that on line 64 remains at logic "0". Lines 54 and 56 are still at logic "1" and logic "0" respectively. Therefore the signal on line 114 changes to logic "0" causing the output on line 112 to change to logic "0" causing clutch dis-engagement. After the knob 42 has pivoted, continued pulling on it in direction B causes the upper shaft part 33 to pivot out of extreme position 48 causing de-selection of the selected gear so that the signal on line 54 goes to logic "0". Now (ignoring what happens when the gearbox is momentarily in the reference neutral position which will be explained below) as long as both lines 54 and 55 are each at logic "0" no change in the logic value on line 114 can change the signal on line 112 to logic "1". Therefore provided the knob 42 remains pivoted in direction b relative to upper shaft part 33, the logic value on line 112 will not change to logic "1" until the continued pulling of the upper shaft part 33 in direction B to extreme position 50 results in the selection of the desired new gear. At which point the signal on line 54 goes to logic "1" again, and line 112 goes to logic "1" causing re-engagement of the clutch. In the course of this gear change the gearbox passed through the reference neutral state corresponding to the upper shaft part 33 crossing line N in direction B. On passing through that reference neutral state the signal in line 56 went to logic "1" momentarily, and then reverted to logic "0". That logic "1" signal on line 56 enables the memory circuit 68 by tripping the flip-flop device forming the interconnected NAND gates 98 and 100, causing the signal on line 114 to go to logic "1" at which value the line 114 remains whilst the gear change to second or fourth by moving the upper shaft part 33 is completed. The logic "1" value for the signal on line 114 provides a memory that the gear change was effected by moving the upper shaft part 33 in direction B. Now if the knob 42 is pulled and tilts in direction b line 114 remains at logic "1" as does line 112 so the clutch is not dis-engaged because the control thus distinguishes that such a pushing of the knob does not signify a wish by the river to change gear. But if the knob 42 is pushed to pivot it in the opposite direction a, that is understood by the control as signifying a desire by the driver to change up or down by selecting first, third or fifth gear as appropriate by moving the upper shaft part 33 in direction A by pushing knob 42. So whilst the signals on lines 56 and 66 are each at logic "0" and that on line 54 is at logic "1", pushing on the knob 42 in direction a causes the signal on line 64 to go to logic "1". That causes the signal on line 114 to go from logic "1" to logic "0". Thus the signal on line 112 also goes from logic "1" to logic "0" thereby causing automatic dis-engagement of the clutch. The clutch re-engages when the signal on line 112 goes to logic "0" when first, third or fifth gear, as desired, is selected by continued movement of the upper shaft part 33 in direction A to the extreme position 48. As the gearbox 12 passes through the reference neutral state corresponding to the upper shaft part 33 traversing line N in direction A the momentary appearance of logic "1" on line 56 enables the memory circuit 68 to change the output ac line 114 to logic "1" which remains when the gear change is completed and serves as a memory state to identify that the gear change was effected as a consequence of moving the upper shaft part 33 in direction A. Therefore the signal on line 112 cannot now be changed to logic "0", by pivoting the knob 42 in direction a. The signal on line 112 can only be changed to logic "0", to disengage the clutch, by pivoting the knob 42 in the opposite direction b to bring line 66 to logic "1" and thus the signal on line 114 to logic "0".

It will be understood that when the gearbox 12 is in the reference neutral state (other than for a momentary period of time which is discussed below) corresponding with the upper shaft part 33 being on line N that the signal at logic "1", on line 56 results in the signal on line 112 being at logic "1", and thus the clutch to engage for as long as the gearbox in the reference neutral state. Pushing or pulling the upper shaft part 33 in direction A or B from line B by manual force applied to the knob 42 results in the signal on line 56 going to logic "0" and thus the signal on line 112 goes to logic "0" too and the clutch dis-engages to allow selection of a forward gear or the reverse gear R. If the latter is the case, the clutch is automatically engaged when the signal on line 54 goes to logic "1" when reverse gear is selected and changes the signal on line 112 to logic "1". The output on line 114 is at logic "1" thereby providing the memory that the upper shaft part 33 was moved in direction B to select reverse gear. Therefore the clutch can now only be dis-engaged by pivoting the knob 42 in the opposite direction a.

There may be a risk, as the upper shaft part 33 moves between one extreme position 48 or 50 and the other, that an aberration may occur in which the knob 42 and the tube 40, for some part of that movement, prematurely resume the initial or centralized position with respect to the upper shaft part under the effect of the resilient means 46, if resistance to the movement of the upper shaft part is only slight. This would mean that the signal at logic "1" on line 64 or 66 would revert to logic "0" for the period of the aberration, and that is undesirable. Therefore, if desired, each line 64 and 66 includes a respective time delay 116 and 118. Each of these time delays 116 and 118 is formed by a diode, a resistance, and a capacitor having one plate earthed. As long as the signal on line 64 or 66 is at logic "1" that signal is applied to the memory circuit 68. When a signal on either line 64 or 66 changes from logic "1" to logic "0" the corresponding time delay 116 or 118 holds the input to the logic gates supplied directly from the particular line 64 or 66 in question at logic "1" for a pre-determined period of time whilst the capacitor in the corresponding time delay discharges. Should the signal on the particular line 64 or 66 not have changed back to logic "1" before the pre-determined period expires then the input to the circuit 68 from that particular line goes to logic "0". When the signal on line 64 or 66 changes from logic "0" to logic "1", the signal at logic "1" is instantly applied to the circuit 68. The aforesaid period of time of each time delay 116 and 118 maybe of any desired and appropriate duration, for example about 0.1 seconds, sufficient during normal gear changing for the upper shaft part 33 to be moved from one extreme position 48 or 50 to the other in the gear shaft pattern. Thus should a signal at logic "1" on line 64 or 66 at the commencement of the gear change subsequently disappear by changing to logic "0" before the gear change is completed, the electronic control 18 will not "see" that logic change provided the new gear is selected before the expiry of the time period set by the relevant time delay 116 or 118.

In the course of a gear change the upper shaft part 33 is moved between extreme positions 48 and 50, thus the gearbox is momentarily in the reference neutral state so that a signal at logic "1" momentarily appears on line 56 whilst that on line 54 continues at logic "0". Either the attitude of the knob 42 or the operation of one of the time delays 116 or 118 ensures that an input to NOR gate 101 is at logic "1" so that the gate provides an output on line 120A at logic "0" to AND gate 82 which also gives an output at logic "0". Thus both inputs to NOR gate 104 are at logic "0" which provides an output from gate 104 at logic "1" thereby ensuring that the output from NOR gate 110 is at logic "0". Therefore whilst the gearbox is momentarily in the reference neutral state the clutch continues to be dis-engaged.

It will be seen in FIG. 3 that NOT gate 88 is connected to line 56 by a line 122A. In the modification in FIG. 4 NOT gate 88 is not connected to line 56, instead gate 88 is connected by line 122B to line 54. Also in FIG. 4, NOT gate 101 (FIG. 3) is omitted, and input line 120B to AND gate 82 is connected to line 114.

Figure 4:
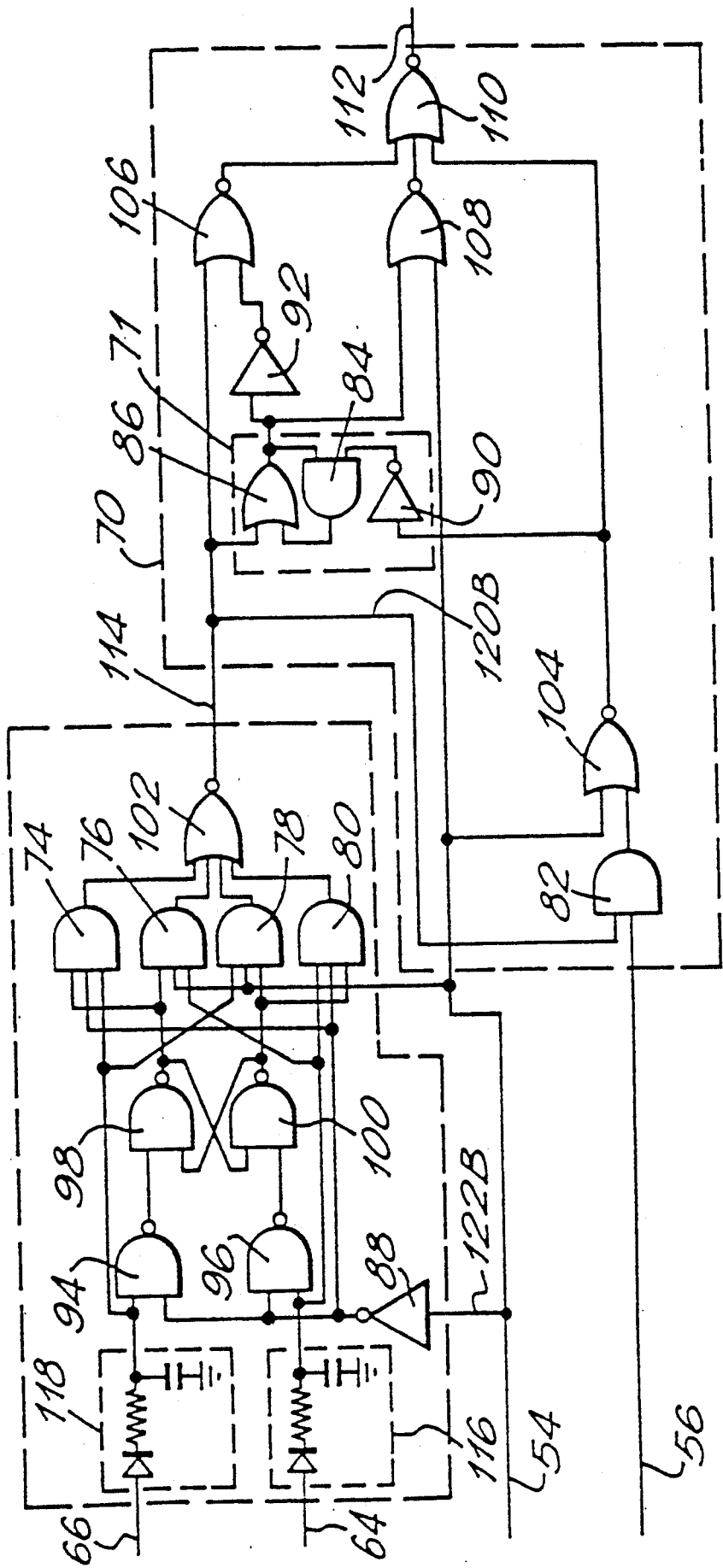
FIG. 4 illustrates a modification of the logic circuit in FIG. 3

In FIG. 4 the line 122B is used to enable the memory circuit 68. In this case it is only when a signal at logic "1" on line 54 occurs (signifying selection of a gear) that the memory circuit 68 is enabled causing the signal at logic "0" on line 114 to change to logic "1" and thus provide the memory of in which direction the upper shaft part 33 was moving at the instant that the gear was selected.

Again with reference to FIG. 4, whilst the gearbox is momentarily in the reference neutral state during a gear change, line 56 goes momentarily from logic "0" to logic "1", but the signal on line 54 remains at logic "0".

This means, since the signal on line 64 or 66 is at logic "1", that either AND gate 74 or 80 continues to have three inputs simultaneously at logic "1" thereby ensuring an output from NOR gate 102 at logic "0" on line 114. This continues to hold the output from AND gate 82 at logic "0" and so the output from NOR gate 104 continues at logic "1" to ensure a continuing output on line 112 from NOR gate 110 at logic "0". Thus the clutch remains dis-engaged whilst the gear box is momentarily in the reference neutral state. If desired the function of memory and initiating circuits 68 and 70 can be replaced by a microprocessor or other computer means suitably programmed and responsive co digitized signals corresponding to those on lines 54, 56, 64 and 66 so that the clutch engagements and disengagements occur as described above, and in particular, that the direction in which the upper shaft part 33 was moved when selecting any gear is memorized.

We claim:

1. A transmission for a motor vehicle, said transmission comprising, a change speed gearbox (12) comprising at least first and second rotatable shafts (21, 22), said second shaft (22) being the output shaft, a plurality of rotatable gear ratios each being de-selectable and each being mutually exclusively selectable for transmitting rotary motion between said shafts (21, 22) through each selected one of said gear ratios, and gear ratio selection means including a gear lever (16) which is manually movable to cause de-selection of any previously selected gear ratio and to cause selection of any desired said gear ratio, and clutch means (14) connected with the first shaft (21) and intended for interposing between the said engine (10) and said first shaft (21), the clutch means (14) being engageable to transmit rotary motion between the said engine (10) and first shaft (21) and disengageable to interrupt that transmission, clutch control means (18, 20) to automatically engage and disengage said clutch means (14), said clutch control means (18, 20) comprising first observing means (52) to observe when any said gear ratio is selected, said gear level (16) having a first part (33) and a second part (40) mounted on the first part (33) and being movable with said first part (33) in response to manual force applied to the second part (40) for transmission to said first part (33), said gear ratios being divided into at least first and second divisions, the first division comprising at least one but not all of said gear ratios and the second division comprising at least one remaining said gear ratio, the first part (33) of the gear lever (16) having limits of movement (48, 50) in first and second opposite directions (A, B) comprising first and second gear shift limit positions (48, 50) which are spaced apart and fixed such that movement of the first part (33) of the gear lever (16) in the first direction (a) is away from the second limit position (50) and towards the first limit position (48) and movement of said first part (33) in the second direction (B) is away from the first limit position (48) and towards the second limit position (50), the first and second divisions being correlated to the first and second limit positions respectively such that movement of the first part (33) of the gear level (16) in said first direction (A) into said first limit position (48) causes selection of a said gear ratio in said first division and movement of said first part (33) in said second division (B) into said second limit position (50) causes selection of said gear ratio in the second division, resilient means (46) acting on the second part (40) of the gear lever to return said second part to a pre-determined initial position relative to said first part (33) when no manual force is applied to said second part (40), said second part (40) being movable to a limited extent relative to the first part (33) in each of two opposite directions (a, b) from said initial position when a force is applied to the second part (40) and wherein one (a) of those two opposite directions (a, b) is in said first direction (A) and the other (b) of those two opposite directions (a, b) is in said second direction (B), and second observing means (58, 60, 62) to observe movement of the second part (40) of the gear lever (16) relative to the first part (33) in said first (A) and second (B) direction respectively, said clutch control means (18, 20) being so arranged that, when the first part (33) of the gear lever (16) is in a said limit position (48, 50) so that a said ratio in the division correlated to that limit position (48, 50) is in a selected state, movement of said second part (40) relative to the first part (33) in a said direction (A, B) toward the other limit position (48, 50) is observed by said second observing means (58, 60, 62) causing the clutch control means (18, 20) to cause automatic disengagement of the clutch means (14), said clutch control means (18, 20) being further arranged such that subsequent to a de-selection of a said gear ratio the next selection of a said gear ratio observed by said first observing means (52) causes said clutch control means (18, 20) to automatically engage said clutch means (14), said clutch control means (18, 20) further comprising a memory arrangement (68) for memorizing in which of said first or said second direction (A, B) the first part (33) of said gear lever (16) was moved into the first or second limit positions (48, 50) respectively to cause the selection of the gear ratio currently in the selected state, and said control means (18, 20) being responsive to said memory arrangement (68) such that said control means (18, 20) inhibits disengagement of said clutch means (14) whilst said gear ratio remains in said currently selected state and the second part (40) of the gear lever (16) is moved in the memorized direction (A, B) relative to the first part (33).

2. A transmission as claimed in claim 1, wherein the said direction (A, B) in which the first part (33) of the gear lever (16) was moved into the first (48) or second (50) limit positions respectively to cause the selection of the gear ratio currently in the selected state, is caused to be memorized by said memory arrangement (68) memorizing the direction (A, B) in which said first part was moved through a reference neutral position (N) between said limit positions (48, 50).

3. A transmission as claimed in claim 1, wherein the said direction (A, B) in which the first part (33) of said gear lever (16) was moved into the first (48) or second (50) limit positions respectively to cause the selection of the gear ratio currently in the selected state, is caused to be memorized by said memory arrangement (68) producing the memory of said direction (A, B) at substantially the instant that the said gear ratio is selected.

4. A transmission as claimed in claim 1, wherein said first observing means (52) is arranged to observe when the first part (33) of the gear lever (16) moves into and moves out of a reference neutral position (N) which lies between the first and second limit positions (48, 50), and said control means (18, 20) is arranged to cause automatic engagement of the clutch means (14) when said first part (33) of the gear lever (16) is in said reference neutral (N) position for longer than a pre-determined period of time, and to cause automatic disengagement of the clutch means (14) when the first part (33) of the gear lever (16) is moved out of said reference neutral position (N) and no gear is in a selected state.

5. A transmission as claimed in claim 4, wherein the control means (18, 20) is arranged to ignore the presence of the first part (33) of the gear lever (16) in the reference neutral position (N) and maintain said clutch means (14) disengaged provided the duration of said presence is less than said predetermined period of time.

6. A transmission as claimed in claim 1, where said control means (18, 20) comprises means programmed and responsive to signals so that clutch engagement and disengagement occurs in the manner set forth in that claim.

* * * * *

UNITED STATES PATENT AND TRADEMARK OFFICE
CERTIFICATE OF CORRECTION

PATENT NO. : 5,038,901

DATED : August 13, 1991

INVENTOR(S) : David PARSONS, Alastair John YOUNG, Roger Porter JARVIS & Harry Mellows WINDSOR It is certified that error appears in the above-identified patent and that said Letters Patent is hereby corrected as shown below:

Column 9, line 2 replace "division" with --direction--.

Signed and Sealed this

Fifteenth Day of December, 1992

*Attest:*

DOUGLAS B. COMER

*Attesting Officer*  *Acting Commissioner of Patents and Trademarks*